Figure 1:
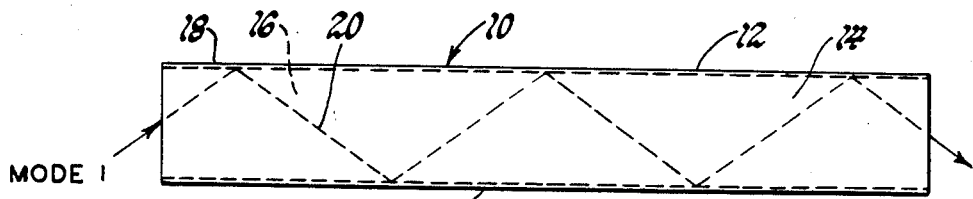

United States Patent [19]

Steele

[11] Patent Number: 4,516,828
[45] Date of Patent: May 14, 1985

[54] DUPLEX COMMUNICATION ON A SINGLE OPTICAL FIBER

[75] Inventor: Robert E. Steele, Cortland, Ohio

[73] Assignee: General Motors Corporation, Detroit, Mich.

[21] Appl. No.: 374,406

[22] Filed: May 3, 1982

[51] Int. Cl.³ ............................................. G02B 5/14
[52] U.S. Cl. ............................... 350/96.16; 350/96.15
[58] Field of Search ................... 350/96.15, 96.16; 455/610, 612, 613, 617

[56] References Cited

U.S. PATENT DOCUMENTS

| | | | |
|---|---|---|---|
| 2,980,957 | 4/1961 | Hicks | 18/8 |
| 3,633,034 | 1/1972 | Uchida | 455/610 |
| 3,813,141 | 5/1974 | Miller | 350/96 |
| 4,362,358 | 12/1982 | Hafle | 350/96.16 |
| 4,378,143 | 3/1983 | Winzer | 350/96.16 |
| 4,381,882 | 5/1983 | Sabine | 350/96.16 |
| 4,399,563 | 8/1983 | Greenberg | 455/612 |
| 4,400,054 | 8/1983 | Biard et al. | 350/96.15 |

OTHER PUBLICATIONS

Fiber Optic Guides of Noncircular Cross Section; Applied Optics; vol. 17, No. 11; Jun. 1, 1978, pp. 1673, 1674; L. Eyges.

*Primary Examiner*—William L. Sikes
*Assistant Examiner*—Robert E. Wise
*Attorney, Agent, or Firm*—Warren D. Hill

[57] ABSTRACT

An optical fiber having a square or rectangular cross section provides one mode of optical signal transmission comprising reflection between one pair of parallel sides and a second mode between a second pair of parallel sides perpendicular to the first pair so that two separate channels are obtained in a single optical fiber. A transmitter and a receiver are coupled to each end of the optical fiber so that full time two-way communication can occur without substantial interference.

4 Claims, 5 Drawing Figures

DUPLEX COMMUNICATION ON A SINGLE OPTICAL FIBER

This invention relates to multiplex fiber optics communications apparatus and in particular to an apparatus for two channel communication with a single optical fiber.

Heretofore attempts to provide full time two-way communication on a single optical fiber have resulted in interference of one channel with another, particularly at the site of coupling light into or out of the fiber. For example, when light is transmitted for a long distance the signal is substantially attenuated thereby mandating strong input signals to produce relatively weak output signals. Then reflections from the input signals at one end can interfere with weaker emitted signals at the same end. As a result of this and other interference phenomena the usual type of two-way communication with one fiber is time sharing or half duplex rather than full duplex where full time two-way communication can take place.

It is a general object of the invention to provide an optical fiber for two channel communication.

It is another object of the invention to provide an optical fiber and a system using the fiber for full duplex communication.

The invention is carried out by providing an optical fiber with a square or rectangular cross section so that it has two pairs of parallel sides each pair allowing a light transmission mode comprising propagation between a pair of parallel sides, the two possible modes being orthogonally related. The invention further contemplates a system utilizing such an optical fiber and pairs of light transmitters and receivers coupled with the fiber for full time two channel communication.

Figure 2:
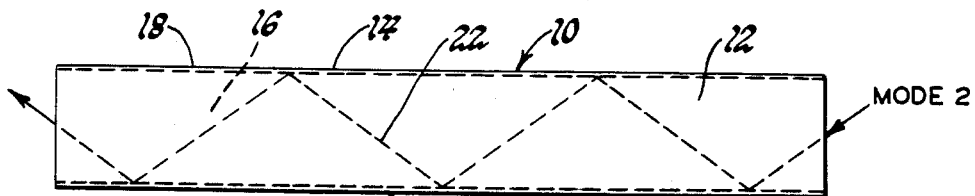
Figure 3:
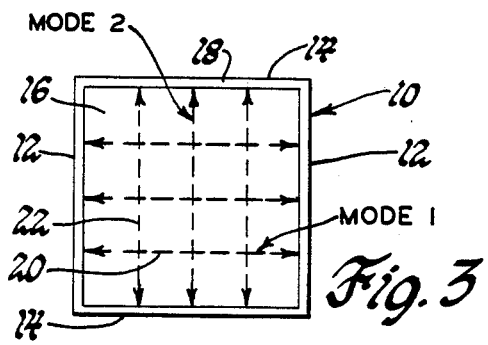
Figure 4:
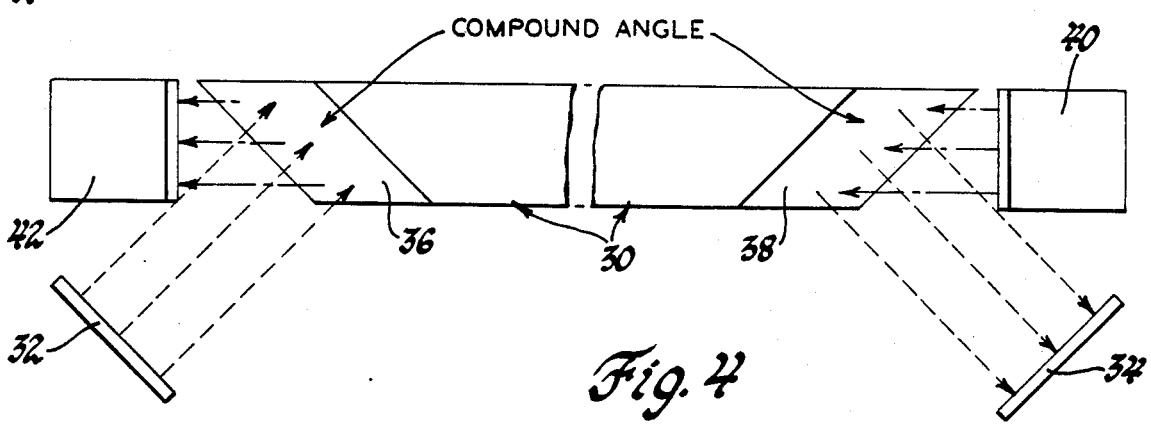
Figure 5:
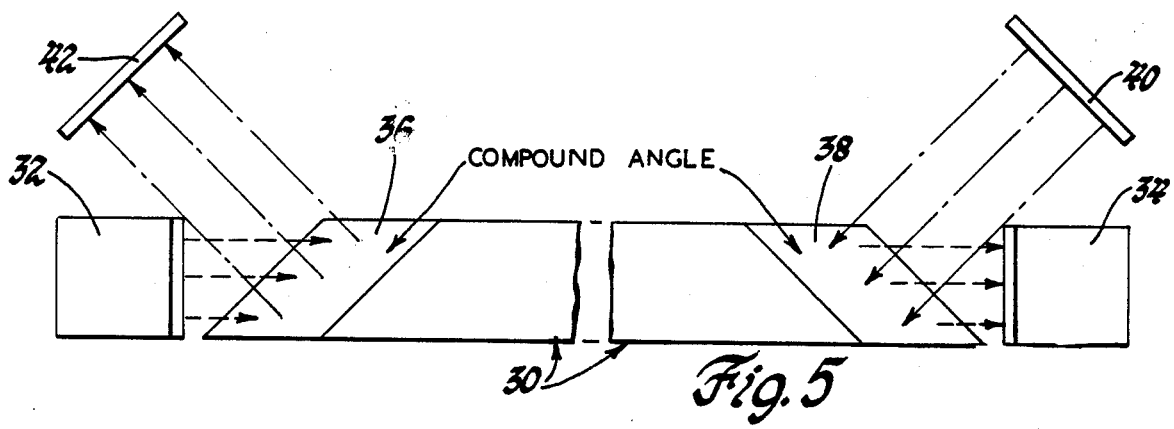

The above and other advantages will be made more apparent from the following specification taken in conjunction with the accompanying drawings wherein like reference numerals refer to like parts and wherein FIG. 1, FIG. 2 and FIG. 3 are top, side and end views, respectively, of an optical fiber according to the invention illustrating two modes of light propagation and FIGS. 4 and 5 illustrate top and side views, respectively, of a multiplex optical system arranged for full time duplex communication according to the invention.

The fiber system according to this invention are useful in data links for various types of communication. One such application is for remote control of functions on an automotive vehicle, e.g. to signal an electronic switch to turn on the headlamps and to feed back a signal to the operator indicating the lamp condition.

As shown in FIGS. 1, 2 and 3, an optical fiber 10 of square or rectangular cross section defines a first pair of parallel sides 12 and a second pair of parallel sides 14 which are perpendicular to the sides 12. The optical fiber material comprises a core 16 of a high index of refraction transparent glass or polymer covered with a coating 18 of lower index of refraction material as is the custom with conventional fiber optic devices. Typical materials are methyl metacrylate polymer core with a fluoro-alkyl methacrylate polymer coating; or barium, flint and borosilicate crown glasses for the core and the coating. The coating should have an index of refraction at least three percent less than the core material. The polymer materials are preferred to glass where maximum flexibility is important. Due to the differences in the index of refraction internal reflection occurs at the interface of the core 16 and coating 18 along the sides 12 and 14 when light is introduced into the fiber. These light paths 20 and 22 are shown by arrows and dashed lines in the drawings. In FIG. 1, mode 1 of light reflection is shown by the light path 20 which is accomplished when light is introduced into the fiber at such an angle that the light will reflect back and forth between the sides 12 and thus propagates from one end of the fiber to the other. Similarly mode 2 of reflection takes place along path 22 as shown in FIG. 2 when light is properly introduced into the fiber to reflect between the sides 14. Both of these modes are superimposed in FIG. 3 and it is seen then that the two modes are orthogonally related. That is, the light path of one light signal is perpendicular to that of the other. Moreover, when the light signals for mode 1 and mode 2 are introduced at opposite ends of the fiber, as shown in FIGS. 1 and 2, then the propagation of those modes will be in opposite directions.

The full duplex system utilizing the optical fiber of this invention is shown in FIGS. 4 and 5 and operates on the principal described above. An optical fiber 30 of square or rectangular cross section has each end cut at a compound angle to facilitate the coupling of light to and from the fiber to form end faces 36 and 38 at the ends. The preferred size of the fiber is on the order of 1 or 2 millimeters in its smallest dimension so that it is practical to fabricate a compound angle. Larger sizes can be used at the sacrifice of flexibilitiy. The particular angle at which the end faces 36 and 38 are cut depends on the acceptance angles and critical angles of materials used. It should be apparent, however, that by using the compound angle, that is, slanting the end faces 36 and 38 so that they make angles with both pairs of sides of the fiber, the light can be admitted and emitted at different angles so as to obviate interference one with another at those coupling locations. Thus efficient coupling can be optimized and stray reflections can be minimized. It is essential, however, that the angles be chosen so that for each mode the admitted light will be directed in a path to reflect between one pair of sides. A light emitting transmitter 32 at one end of the optical fiber 30 projects light into the fiber 30 through its slanted end face 36 and light emitted from the fiber through the other slanted end face 38 is detected by a receiver 34 thereby completing the communication channel for mode 1. Similarly for mode 2 a transmitter 40 adjacent the receiver 34 and a receiver 42 adjacent the transmitter 32 provides and receives the light signal for a second mode operation. The two modes are effectively separate channels. Since they are propagated in different directions and are reflected by surfaces which are orthogonally related this allows full duplex communication without interference of one channel with another. Of course those channels of communication could be in the same direction if desired by placing both transmitters on one end of the fiber and both receivers on the other end. The transmitter is preferably a light transmitting diode operating on a pulsed manner by circuitry, not shown. The receiver includes a light sensitive element such as a phototransistor. These are suitable for the vehicle application mentioned above. For other data link applications other light sources and detectors may be more appropriate.

It will be seen then that the optical fiber and the system according to the invention allow two separate channels of communication utilizing only a single optical fiber and in particular provide a way of establishing full time two-way communication with the single fiber.

The embodiments of the invention in which an exclusive property or privilege is claimed are defined as follows:

1. A multiplex optical fiber capable of simultaneously transmitting information in the form of light in the same direction or in opposite directions between transmitting and receiving locations comprising:

a substantially rectangular cross section optical fiber having two pairs of parallel internally reflective sides defining first and second orthogonally related light propagating channels;

and transmitting and receiving light coupling means at said locations for each channel constructed and arranged to couple light to and from the respective channels in a manner to provide propagation in the two channels whereby each channel of the fiber transmits light energy between respective transmitting and receiving locations without substantial interference from the other.

2. A multiplex optical fiber capable of simultaneously transmitting information in the form of light between transmitting and receiving locations comprising:

a substantially rectangular cross section optical fiber having two pairs of parallel internally reflective sides defining first and second orthogonally related light propagating channels;

and transmitting and receiving light coupling means at said locations for each channel constructed and arranged to couple light to and from the respective channels in a manner to provide propagation in the two channels, each light coupling means including a fiber end surface disposed at a compound angle with respect to the said sides so that light for one channel is coupled into the fiber at one end surface at one angle and light for another channel is coupled out of the fiber at the same one end surface at another angle whereby each channel of the fiber transmits light energy between respective transmitting and receiving locations without substantial interference from the other.

3. An optical fiber for simultaneous two-way communication by two perpendicular modes of reflection comprising:

a transparent substantially square cross section optical fiber having a high index of refraction core clad with a relatively low index of refraction coating, the fiber including first and second orthogonally related pairs of parallel sides, a first end surface disposed at a compound angle with respect to the said sides for admitting light into a first end of the fiber for propagation in one direction to a first receiving location by internal reflection between the first pair of parallel sides of the fiber; and a second end surface disposed at a compound angle with respect to the said sides for admitting light into a second end of the fiber for propagating in the other direction to a second receiving location by internal reflection between the second pair of parallel sides of the fiber.

4. A multiplex optical transmission system capable of simultaneously transmitting information in the form of light in the same direction or in opposite directions between light transmitting and receiving devices comprising:

a length of rectangular optical fiber located between the transmitting and receiving devices having pairs of parallel light reflective sides defining first and second orthogonally related light propagating channels; and light coupling means comprising fiber end surfaces associated with each transmitting and receiving device for coupling a device to a respective first or second propagating channel of said fiber, each coupling means associated with a transmitting device being so constructed and arranged as to couple light to the respective channels in a manner to provide propagation in said two orthogonally related channels whereby each channel of said fiber transmits light energy between respective transmitting and receiving devices without substantial interference from the other.

* * * * *